(12) United States Patent
Chase et al.

(10) Patent No.: US 7,623,257 B2
(45) Date of Patent: Nov. 24, 2009

(54) METHOD FOR HANDLING FAXES BY A FAX MACHINE

(75) Inventors: Thomas Edward Chase, Welwyn Garden (GB); Andrew Leighton Jordan, Harpenden (GB)

(73) Assignee: Xerox Corporation, Rochester, NY (US)

( * ) Notice: Subject to any disclaimer, the term of this patent is extended or adjusted under 35 U.S.C. 154(b) by 888 days.

(21) Appl. No.: 11/171,941

(22) Filed: Jun. 30, 2005

(65) Prior Publication Data

US 2007/0002387 A1   Jan. 4, 2007

(51) Int. Cl.
   *G06F 15/00* (2006.01)
   *G05B 19/418* (2006.01)
(52) U.S. Cl. .......................................... 358/1.15; 705/8
(58) Field of Classification Search ................ 358/1.15, 358/1.14, 1.13, 402, 407, 400, 401, 1.9, 473, 358/1.16, 1.18; 713/162, 167, 168, 190, 713/300; 705/8, 1, 10, 11, 14, 26, 27; 709/204, 709/206, 202, 223, 225, 246
See application file for complete search history.

(56) References Cited

U.S. PATENT DOCUMENTS

2004/0212828 A1 * 10/2004 Peled et al. ................ 358/1.15
2004/0263894 A1   12/2004 Barrett et al.

* cited by examiner

*Primary Examiner*—Saeid Ebrahimi Dehkordy
(74) *Attorney, Agent, or Firm*—Fay Sharpe, LLP

(57) ABSTRACT

A method of handling faxes by a fax machine is provided. The method includes generating user-configured rules, each user-configured rule including a corresponding fax job condition and an associated fax machine action to be performed if the corresponding fax job condition is met. The method also includes generating a user-configured policy for handling faxes in a fax job including the user selecting the user-configured rules to be applied when the user-configured policy is applied and the user ranking the user-configured rules from a highest rank to a lowest rank. The method also includes a fax machine receiving a fax job and applying the user-configured policy to the fax job by applying the user-configured rules in an order of application from the highest ranked rule to the lowest ranked rule.

17 Claims, 4 Drawing Sheets

METHOD FOR HANDLING FAXES BY A FAX MACHINE

BACKGROUND

The embodiments described herein relate generally to facsimile machines, also known as fax machines or multifunction machines and more particularly to a system and method of processing incoming and outgoing faxes.

Faxing information has proven to be a simple and useful way of sending the information across long distances. As a result, a large number of faxes are sent and received daily. An Internet facsimile (I-Fax) apparatus is a facsimile apparatus provided with functions of converting image data to a file and transmitting/receiving it over a computer network, a typical example of which is the Internet. The Internet facsimile apparatus is capable of carrying out usual facsimile communications over a Public Switched Telephone Network (PSTN), and therefore it also can function as apparatus connected between a computer network and PSTN.

In comparison to transmitting an original message formed of, for example, an image and/or one or more accompanying files, to a facsimile apparatus connected to the PSTN, Internet facsimile transmission over a network using the Internet facsimile by E-Mail can reduce communication costs compared to transmitting data only over the PSTN.

However, not all fax jobs are the same. One may be from an important customer requesting deliver of spares, another can be a junk fax, and other faxes can be addressed to specific mailboxes stored on the fax machine. Some of the incoming faxes can be from recognized numbers while other faxes may be from strangers. It is desirable therefore to enable a user to have more control over how incoming and outgoing faxes are handled.

BRIEF DESCRIPTION

In accordance with one aspect of the embodiments described herein, there is provided a method of handling faxes by a fax machine. The method includes generating user-configured rules, each user-configured rule including a corresponding fax job condition and an associated fax machine action to be performed if the corresponding fax job condition is met, generating a user-configured policy for handling faxes in a fax job including the user selecting the user-configured rules to be applied when the user-configured policy is applied and the user ranking the user-configured rules from a highest rank to a lowest rank, the fax machine receiving a fax job and applying the user-configured policy to the fax job by applying the user-configured rules in an order of application from the highest ranked rule to the lowest ranked rule.

BRIEF DESCRIPTION OF THE DRAWINGS

The foregoing and other features of the exemplary embodiment will be apparent and easily understood from a further reading of the specification, claims, and by reference to the accompanying drawings in which:

DETAILED DESCRIPTION OF THE EXEMPLARY EMBODIMENT

Figure 1:
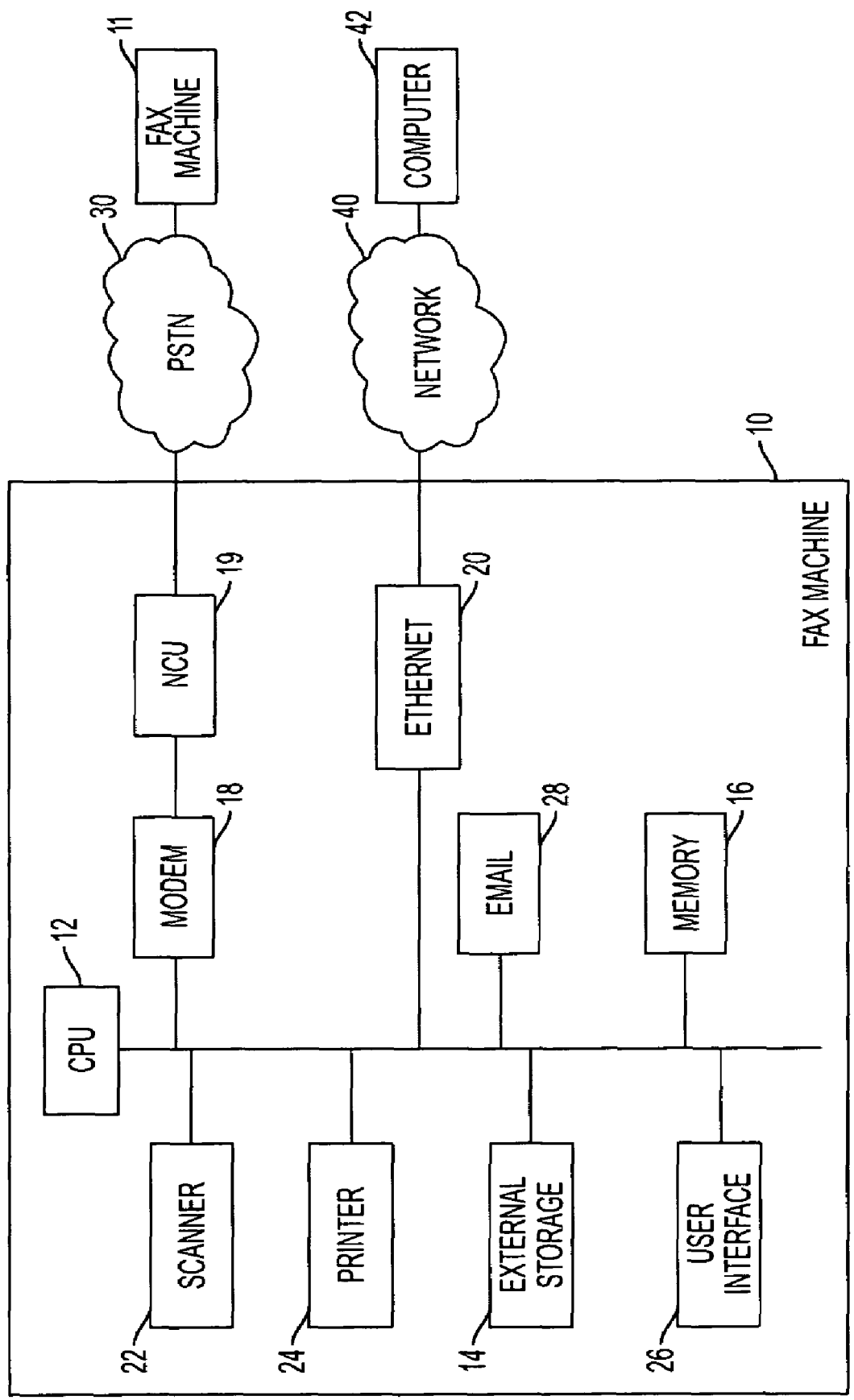
FIG. 1 is a diagrammatic view of a fax machine.

Referring to the drawings, FIG. 1 is a schematic depiction of the various components of a facsimile apparatus, also referred to as a fax machine 10. The fax machine 10 is connected to a telecommunications network, such as the Public Switched Telephone Network (PSTN) 30, for sending images, referred to herein as facsimiles or faxes, to other fax machines 11. The fax machine 10 can also receive faxes from other fax machines 11 via the PSTN 30. The process of sending and/or receiving faxes is referred to herein as a fax job.

The fax machine 10 also includes a network connection 20, such as an Ethernet connection, for connecting the machine to a Network 40. The Network can be a Local Area Network (LAN), a Wide Area Network (WAN), or the Internet. Therefore, the fax machine can also be referred to as an I-fax machine, or an E-fax machine. The fax machine 10 can also include external storage 14, such as mailboxes which can be programmed to receive faxes in electronic form. The mailboxes can be on remote devices, such as a server 42 or other computers connected to the fax machine 10 via the network 40. The fax machine can include email functionality 28 for sending email messages to remote computers 42, such as personal computers, via the network 40. The electronic form of faxes can be sent over the network, for example, by compressing the fax image data, converting it to a TIFF file and text-coding the TIFF file, then adding it to the data section of e-mail in accordance with such as MIME (Multipurpose Internet Mail Extensions) and transmitting/receiving it as an E-mail.

The fax machine 10 includes a Central Processing Unit (CPU) 12, also referred to as a controller, for controlling the functionality of the fax machine in a centralized manner, including handling fax jobs in the manner as described herein. The fax machine 10 also includes memory 16 such as ROM and/or RAM for storing the programming suitable for carrying out fax job functions.

The fax machine also includes a modem 18 or other device suitable for connecting to the PSTN 30 for sending and receiving faxes. The modem 18 is operable for modulating and demodulating a facsimile protocol signal and image signal. A Network Chassis Unit (NCU) 19 connects the fax machine 10 to a telephone line to make an outgoing call to and receive an incoming call from a phone line in the PSTN 30 and to interface analog signals.

The fax machine 10 includes a scanner 22 for scanning documents to form electronic representations of the images thereof which can be sent as faxes in a fax job. The fax machine 10 also includes a printer 24 for forming printed images of received faxes, among other things, on sheet material such as paper.

The fax machine 10 also includes a user interface 26 which can include a display screen and a control panel that enable a user to operate the fax machine. The user interface 26 may include a Graphic User Interface (GUI) displayable on the screen. The user interface 26 can be used to program the functionality of the fax machine for handling faxes in the manner as described below. It should be appreciated that the fax machine may also be operated or programmed remotely via a computer 42 connected to the fax machine by the network 40.

Figure 2:
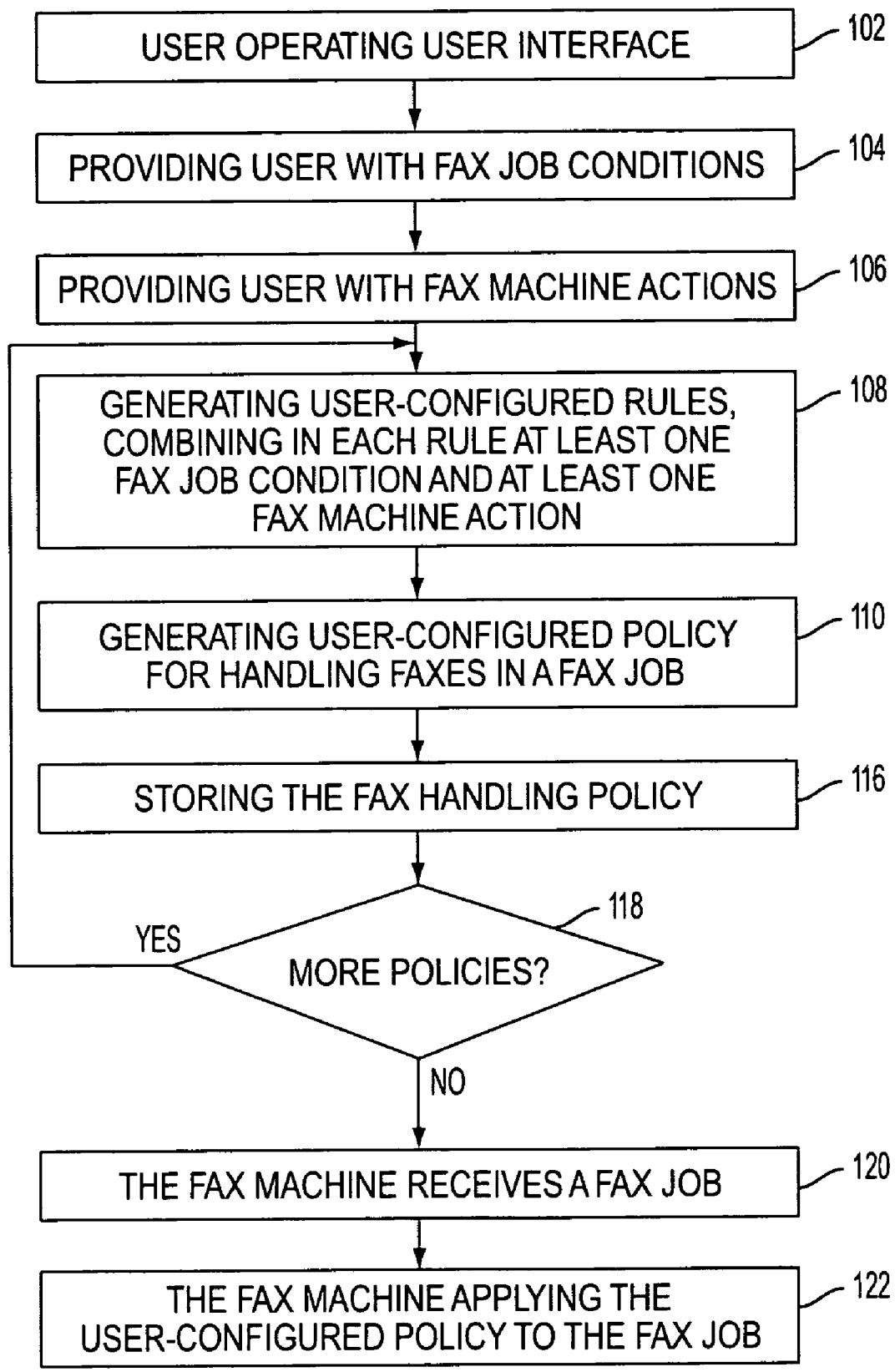
FIG. 2 is a flow chart illustrating a portion of a method for handling fax jobs in a fax machine.
Figure 3:
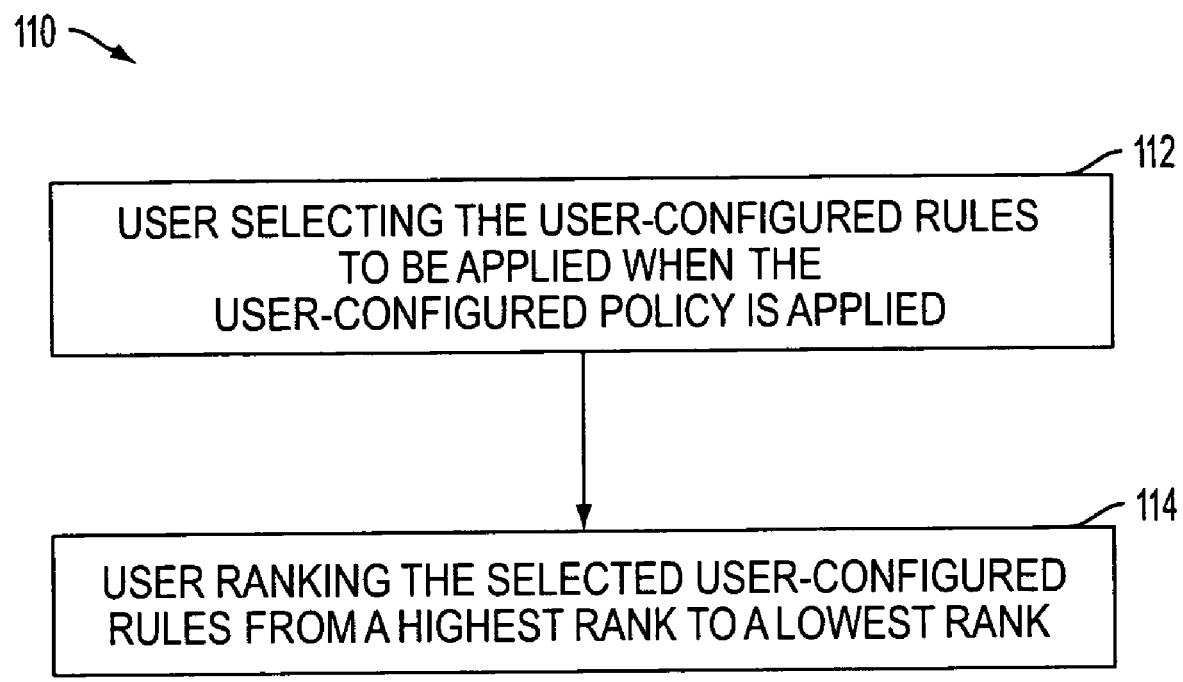
FIG. 3 is a flow chart illustrating a portion of a method for handling fax jobs in a fax machine.
Figure 4:
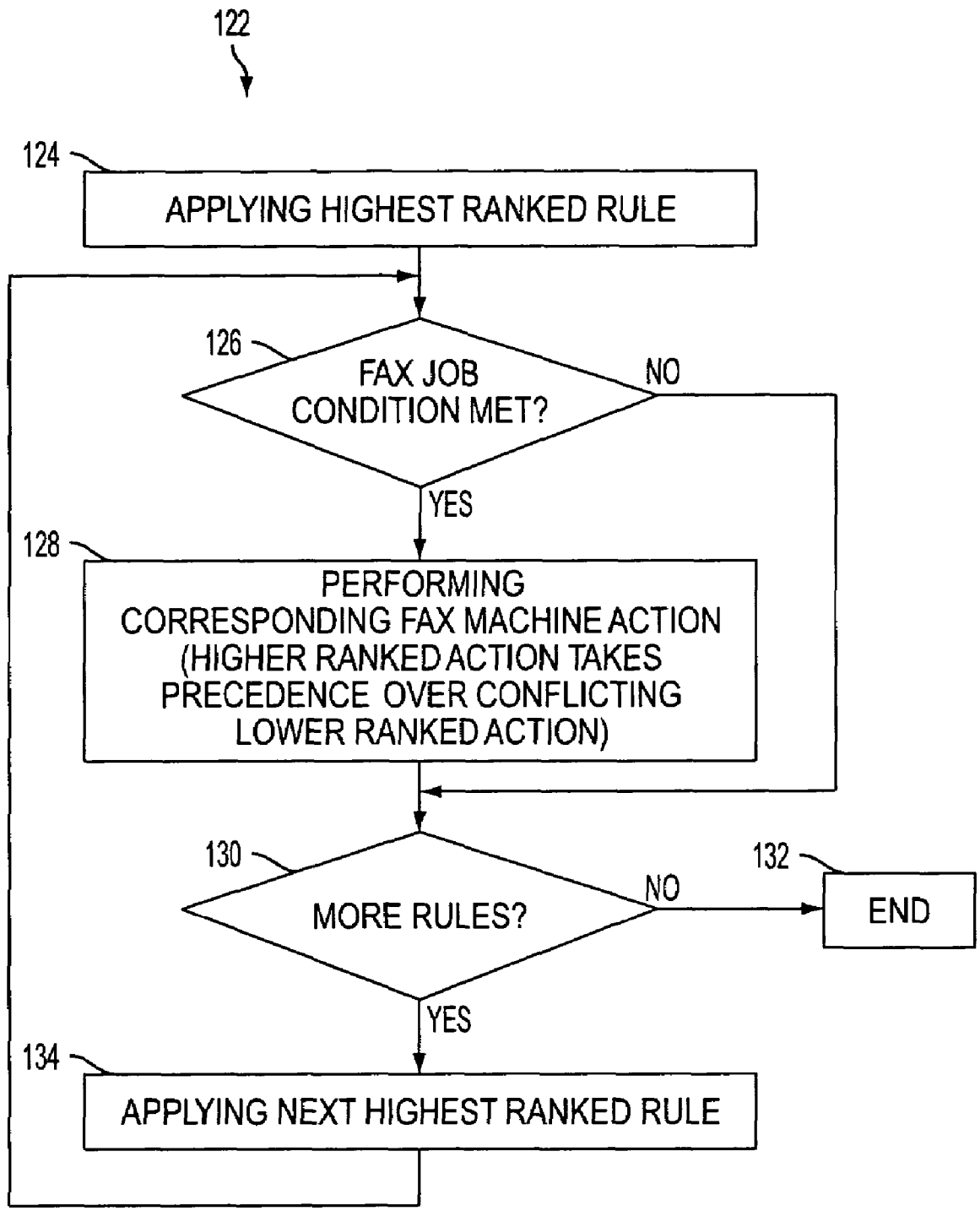
FIG. 4 is a flow chart illustrating a portion of a method for handling fax jobs in a fax machine.

Referring now to FIGS. 2-4 there is illustrated a method for handling faxes by a fax machine. An operator, also referred to as a fax machine user, operates the user interface 26 at 102. The user interface 13 provides the user with fax job conditions at 104. The fax job conditions can be represented to the user by the user interface 26 with words or phrases, or by graphic symbols, etc. Examples of a fax job conditions can include, but are not limited to, sending faxes to a particular dialing codes, as determined by portions of the phone number that the fax is sent to. The dialing codes can represent particular geographic regions, such as cities, states or countries which may be of interest. In a similar manner, other fax job conditions can include receiving faxes from particular dialing codes.

Other examples of fax job conditions can include sending faxes to and/or receiving faxes from specific phone numbers which represent specific destinations/entities, such as customers, suppliers, branch offices, and unwanted soliciting entities such as senders of junk faxes. Other fax job conditions can include the size of the fax being sent or being received in the fax job. The size can be measured by amount of data, such as in kiobytes, or megabytes, etc. The size can also be measured by the number of pages or images, such as receiving a fax that is 10 or more pages. Other examples of fax job conditions can include sending or receiving faxes at a particular time of day, such as between 9 am and 5 pm, or after 6 pm, etc. Other examples of fax job conditions can also include receiving a fax in a particular mailbox. It should be appreciated that other fax job conditions could be contemplated.

The user interface 13 provides the user with fax machine actions at 106. The actions can be represented to the user by the user interface 26 with words or phrases, or by graphic symbols, etc. Examples of the fax machine actions can include, but are not limited to, printing a report, hanging up the phone line, printing more than one copy of a received fax, blocking a user from sending a fax, sending one or more email notifications, forwarding a received fax electronically via email, forwarding a received fax to another fax machine at different fax number, filing copies of a sent or received fax to an FTP server, filing copies of a sent or received fax to an FTP server without printing the fax, and sending a pager alert to a pager using the pager's phone number. It should be appreciated that other fax machine actions could be contemplated.

The user then configures rules at 108 by combining one or more fax job conditions with at least one fax machine action. The user can configure the rules using the user interface 26 such as by clicking on fax job conditions and fax machine actions to combine them, by clicking and dragging symbols representing them, or in other manners. Each rule configured by the user includes at least one fax job condition and a fax machine action to be taken by the fax machine 10 should the fax job condition be met when the rule is applied as described in further detail below.

An examples of a rule which can be configured by the user in step 108 can include, combining the fax job condition of receiving a fax sent from a branch office as represented by a particular fax number, with the fax machine action of filing the fax images received electronically in a specific folder on a file server 40 connected to the fax machine via the network 40.

As stated above, more than one fax machine action can be included in the rule, so for example the fax images received can be filed in a specific folder on a file server and an electronic email can be sent to person notifying them that a fax has been received from a particular destination and has been saved at a particular location. Another example can include combining the fax job condition of receiving faxes sent to a particular fax mailbox with the fax machine actions of sending an email notification to the owner of the fax mailbox and sending an email notification to the owner's secretary requesting that the hardcopy of the received fax be filed appropriately. It is contemplated that the rules configured in 108 described above can also include more than one fax job condition combined with one or more fax machine actions.

A user-configured fax handling policy is then generated at 110 for handling one or more faxes in a fax job performed by the fax machine. Referring to FIG. 3, the step of generating the fax handling policy of step 110 further includes the user selecting at least some of the user-configured rules generated in step 108 above at 112. The selected rules are applied when the user-configured fax handling policy is applied to a fax job performed by the machine as described below.

The user then ranks the rules selected at 112 from a highest ranked rule to a lowest ranked rule at 114. The rules will be applied in order of rank when the policy is applied so that the highest ranked rule will be applied first and the lowest ranked rule will be applied last. The user can rank the rules by assigning them numbers representing their rank, or assembling them in an order which represents their rank such as in a column by clicking and dragging them with a pointing device in a GUI to assemble. Referring again to FIG. 2, the policy is then stored at the fax machine at 116 in a storage medium, such as RAM 16, for future use by the controller 12. The user can configure a plurality of policies at 118 by repeating steps 108, 110, and 116.

When the fax machine 10 receives a fax job, such as sending a fax or receiving a fax, the controller 12 applies the fax handling policy to the fax job at 122. Referring now to FIG. 4, the step 122 of applying the fax handling policy to the fax job is shown in greater detail. The controller applies the highest ranked rule in the policy at 124. For example, suppose the highest ranked rule in the policy includes the fax job condition of receiving a fax from a branch office as represented by a particular fax number combined with the fax machine operation of filing the received fax in a particular electronic mailbox. The controller determines if the fax job condition associated with the rule being applied is met at 126. If the fax job condition is met, the controller performs the corresponding fax machine action at 128. If the fax job condition is not met, the controller moves to step 130. In step 130, the controller 12 determines if the policy contains more rules. If the fax handling policy does not contain more rules, this portion of the fax handling control scheme is concluded at 132. If it is determined that the fax handling policy does contain more rules at 130, the controller applies the next highest ranked rule at 134 by repeating steps 126 and 128 for the fax job condition and fax machine action corresponding to the rule being applied. This process is repeated until all the rules of the fax handling policy are applied.

If desired, the fax machine controller 12 can be programmed so that a fax machine action corresponding to a rule having a higher ranking takes precedence over a fax machine action corresponding to a rule having a lower ranking when the fax job conditions of both rules are met in the step of applying the user-configured policy to the fax job at step 122. In this manner, the fax machine action corresponding to the higher ranked rule is performed and the fax machine action corresponding to the lower ranked rule is not performed. Alternatively, this can be done only if the fax machine actions resulting from both rules conflict with each other.

By enabling the user to configure rules with wide variety of fax job conditions combined with fax machine actions, and ranking the rules to determine their order of application, the fax handling policies can enable customized treatment of fax jobs by the fax machine.

While particular embodiments have been described, alternatives, modifications, variations, improvements and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A method of handling faxes by a fax machine comprising:
generating user-configured rules each including a fax job condition and an associated fax machine action to be performed if the corresponding fax job condition is met, wherein at least one of the fax job conditions includes receiving a fax from a specific dialing code or sending a fax to a specific dialing code and the fax machine action associated with the at least one of the fax job conditions includes at least one of printing a report, disconnecting the phone line, printing multiple copies of the fax, blocking the user from sending the fax, sending an e-mail notification notifying of the receipt of the fax, forwarding a received fax via e-mail, forwarding the fax to a different fax machine, filing copies of the fax to an FTP server, filing copies of the fax to an FTP server without printing the fax, printing the fax in a secure print mode, and sending a pager alert notifying of the receipt of the fax;
generating a user-configured policy for handling faxes in a fax job including the user selecting one or more of the user-configured rules to be applied when the user-configured policy is applied and the user ranking the user-configured rules from a highest rank to a lowest rank;
the fax machine receiving a fax job; and
the fax machine applying the user-configured policy to the fax job by applying the user-configured rules in an order of application from the highest ranked rule to the lowest ranked rule, each rule being applied by determining if the corresponding fax job condition is met and performing the associated fax machine action if the corresponding fax job condition is met.

2. The method defined in claim 1 wherein at least one of the user-configured rules includes a plurality of fax job conditions which must all be met for the associated fax machine action to be taken.

3. The method defined in claim 1 wherein a fax machine action corresponding to a rule having a higher ranking takes precedence over a conflicting fax machine action corresponding to a rule having a lower ranking when the fax job conditions of both rules are met in step of applying the user-configured policy to the fax job such that the fax machine action corresponding to the higher ranked rule is performed and the fax machine action corresponding to the lower ranked rule is not performed.

4. The method defined in claim 1 wherein the dialing code represents a geographic region.

5. The method defined in claim 1 wherein a fax job condition includes receiving a fax from a specific phone number or sending a fax to a specific phone number and the fax machine action associated with this fax job condition includes one of printing a report, disconnecting the phone line, printing multiple copies of the fax, blocking the user from sending the fax, sending an e-mail notification notifying of the receipt of the fax, forwarding a received fax via e-mail, forwarding the fax to a different fax machine, filing copies of the fax to an FTP server, filing copies of the fax to an FTP server without printing the fax, printing the fax in a secure print mode, and sending a pager alert notifying of the receipt of the fax.

6. The method defined in claim 1 wherein at least one of the user-configured rules includes a plurality of fax machine actions.

7. The method defined in claim 1 wherein at least one of the user-configured rules includes a plurality of fax job conditions and a plurality of fax machine actions.

8. The method defined in claim 1 further comprising:
generating a plurality of user-configured policies; and
the fax machine applying the plurality of user-configured policies.

9. The method defined in claim 1 wherein the fax job conditions include a fax page number threshold and a fax data size threshold and a time of day.

10. The method defined in claim 9 wherein at least one of the user-configured rules includes a plurality of fax job conditions which must all be met for the associated fax machine action to be taken.

11. The method defined in claim 1 wherein the generating user-configured rules further comprises a user configuring rules using a graphic user interface.

12. A method of handling faxes by a fax machine comprising:
generating user-configured rules each including a corresponding fax job condition and an associated fax machine action to be performed if the corresponding fax job condition is met, wherein at least one of the fax job conditions includes a fax page number threshold or a fax data size threshold and the fax machine action associated with the at least one of the fax job conditions includes at least one of printing a report, disconnecting the phone line, printing multiple copies of the fax, blocking the user from sending the fax, sending an e-mail notification notifying of the receipt of the fax, forwarding a received fax via e-mail, forwarding the fax to a different fax machine, filing copies of the fax to an FTP server, filing copies of the fax to an FTP server without printing the fax, printing the fax in a secure print mode, and sending a pager alert notifying of the receipt of the fax;
generating a user-configured policy for handling faxes in a fax job including the user selecting the user-configured rules to be applied when the user-configured policy is applied and the user ranking the user-configured rules from a highest rank to a lowest rank;
the fax machine receiving a fax job; and
the fax machine applying the user-configured policy to the fax job by applying the user-configured rules in an order of application from the highest ranked rule to the lowest ranked rule, each rule being applied by determining if the corresponding fax job condition is met and performing the associated fax machine action if the corresponding fax job condition is met.

13. The method defined in claim 12 wherein at least one of the user-configured rules includes a plurality of fax job conditions which must all be met for the associated fax machine action to be taken.

14. The method defined in claim 12 wherein a fax machine action corresponding to a rule having a higher ranking takes precedence over a conflicting fax machine action corresponding to a rule having a lower ranking when the fax job conditions of both rules are met in step of applying the user-configured policy to the fax job such that the fax machine action corresponding to the higher ranked rule is performed and the fax machine action corresponding to the lower ranked rule is not performed.

15. A method of handling faxes by a fax machine comprising:

generating user-configured rules each including a fax job condition and an associated fax machine action to be performed if the corresponding fax job condition is met, wherein at least one of the fax job conditions includes a time of day and the fax machine action associated with the at least one of the fax job conditions includes at least one of printing a report, disconnecting the phone line, printing multiple copies of the fax, blocking the user from sending the fax, sending an e-mail notification notifying of the receipt of the fax, forwarding a received fax via e-mail, forwarding the fax to a different fax machine, filing copies of the fax to an FTP server, filing copies of the fax to an FTP server without printing the fax, printing the fax in a secure print mode, and sending a pager alert notifying of the receipt of the fax;

generating a user-configured policy for handling faxes in a fax job including the user selecting one or more of the user-configured rules to be applied when the user-configured policy is applied and the user ranking the user-configured rules from a highest rank to a lowest rank;

the fax machine receiving a fax job; and the fax machine applying the user-configured policy to the fax job by applying the user-configured rules in an order of application from the highest ranked rule to the lowest ranked rule, each rule being applied by determining if the corresponding fax job condition is met and performing the associated fax machine action if the corresponding fax job condition is met.

16. The method defined in claim 15 wherein at least one of the user-configured rules includes a plurality of fax job conditions which must all be met for the associated fax machine action to be taken.

17. The method defined in claim 15 wherein a fax machine action corresponding to a rule having a higher ranking takes precedence over a conflicting fax machine action corresponding to a rule having a lower ranking when the fax job conditions of both rules are met in step of applying the user-configured policy to the fax job such that the fax machine action corresponding to the higher ranked rule is performed and the fax machine action corresponding to the lower ranked rule is not performed.

* * * * *